US010036247B2

(12) United States Patent
Moronkeji et al.

(10) Patent No.: US 10,036,247 B2
(45) Date of Patent: Jul. 31, 2018

(54) DOWNHOLE FIBER OPTIC MEASUREMENT OF PACKERS DURING FLUID INJECTION OPERATIONS

(71) Applicants: Dee Adedotun Moronkeji, Montgomery, TX (US); Javier Alejandro Franquet, Abu Dhabi (AE); Ian Mitchell, Houston, TX (US)

(72) Inventors: Dee Adedotun Moronkeji, Montgomery, TX (US); Javier Alejandro Franquet, Abu Dhabi (AE); Ian Mitchell, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 302 days.

(21) Appl. No.: 14/942,531

(22) Filed: Nov. 16, 2015

(65) Prior Publication Data
US 2017/0138187 A1    May 18, 2017

(51) Int. Cl.
*E21B 49/00* (2006.01)
*E21B 33/12* (2006.01)
(Continued)

(52) U.S. Cl.
CPC ............ *E21B 49/008* (2013.01); *E21B 33/12* (2013.01); *E21B 43/26* (2013.01); *E21B 47/06* (2013.01);
(Continued)

(58) Field of Classification Search
CPC ........ E21B 49/008; E21B 33/12; E21B 43/26; E21B 47/06; E21B 47/065; E21B 47/123; G01B 11/165
See application file for complete search history.

(56) References Cited

U.S. PATENT DOCUMENTS 5,353,637 A * 10/1994 Plumb ................... E21B 49/008
                                                166/101
6,601,671 B1 * 8/2003 Zhao ....................... G01V 1/16
                                                181/108
(Continued)

FOREIGN PATENT DOCUMENTS

WO    2014098941 A1    6/2014

OTHER PUBLICATIONS

Fernandez-Vallejo, et al., "Remote (250 km) Fiber Bragg Grating Multiplexing System", Sensor 2011, pp. 8711-8720.
(Continued)

*Primary Examiner* — Wei Wang
(74) *Attorney, Agent, or Firm* — Cantor Colburn LLP (57) ABSTRACT

An embodiment of a system for performing a downhole operation includes a carrier having an isolation assembly including at least one packer having a deformable element configured to isolate a section of a borehole in the earth formation, and an injection assembly configured to inject a fluid into the isolated section and pressurize the isolated section. The system also includes a measurement assembly including an interrogation unit coupled to at least one optical fiber having a length disposed at the deformable element that includes a plurality of measurement locations, and a processor configured to receive signals reflected by the plurality of measurement locations in real time during the downhole operation, calculate an amount of deformation of the deformable packer element, and estimate at least one property of the formation based on the deformation, the at least one property including a strain of the formation in response to injection of fluid.

20 Claims, 4 Drawing Sheets

(51) Int. Cl.
   *E21B 43/26* (2006.01)
   *E21B 47/06* (2012.01)
   *E21B 47/12* (2012.01)
   *G01B 11/16* (2006.01)

(52) U.S. Cl.
   CPC .......... *E21B 47/065* (2013.01); *E21B 47/123* (2013.01); *G01B 11/165* (2013.01)

(56) References Cited

U.S. PATENT DOCUMENTS

| | | |
|---|---|---|
| 2004/0065436 A1 | 4/2004 | Schultz et al. |
| 2005/0199401 A1 | 9/2005 | Patel et al. |
| 2010/0212891 A1 | 8/2010 | Stewart et al. |
| 2012/0111559 A1 | 5/2012 | Deady et al. |

OTHER PUBLICATIONS

Kamal, S. Zafar; "Fiber Optic Sensing: Evolution to Value" SPE-167907-MS; SPE Conference, Ulrecht, The Netherlands, Apr. 1-3, 2014; 9 pages.

Proximion; "Fiber Optic Sensors"; Retrieved Nov. 17, 2015; Retrieved from the internet:;URL:http://www.proximion.com/fiber-optic-sensors/, 10 pages.

Rassenfoss, S., Fiber Optic Sensing:, JPT , Mar. 2012, 6 pages.

Smartec, "Optical Sensors for ITER Magnets"; Retrieved Nov. 18, 2015; Retrieved from the internet:; URL: http://www.smartec.ch/Ref/Optical-Sensors-for-ITER-Magnets, 2 pages.

Strong, et al., "An Integrated System for Pipeline Condition Monitoring"; IPTC 13661; International Petroleum Tech Conference, Doha, Qutar; Dec. 7-9, 2009; 13 pages.

Trpkovski, et al.; "Dual temperature and strain sensor using a combined fiber Bragg grating and fluorescence intensity ratio technique in Er3+-doped fiber"; (2003); Review of Scientific Instruments; vol. 74, Issue 5; American Institute of Physics.; 6 pages.

Walker, et al., "Fibre Optic Leak Detection", 2003 Offshore Technology Conference, Houston, Texas, May 5-8, 2003; 11 pages.

International Search Report, International Application No. PCT/US2016/061181, dated Feb. 9, 2017, Korean Intellectual Property Office; International Search Report 3 pages.

International Written Opinion, International Application No. PCT/US2016/061181, dated Feb. 9, 2017, Korean Intellectual Property Office; International Written Opinion 10 pages.

* cited by examiner

Good fracture containment

Poor fracture containment

FIG.4

DOWNHOLE FIBER OPTIC MEASUREMENT OF PACKERS DURING FLUID INJECTION OPERATIONS

BACKGROUND

In the drilling and completion industry it is known that operations affecting an earth formation including operations such as fracturing, or "fracing", operations can be beneficial for a number of reasons. In some cases, for example, fracturing operations help to stimulate the production of hydrocarbons from earth formations. In such operations, portions of the formation are fractured to increase fluid flow from the formation into a borehole. Fracturing generally includes isolating a portion of the borehole and injecting fluid to cause fractures in the formation, and thereby improve production capacity.

In addition to full-scale fracturing operations, smaller scale fluid injection operations can be performed to estimate formation properties. For example, micro-fracturing tests are performed to measure formation breakdown pressure, fracture closure pressure and stress characteristics of a formation. Such tests are useful in obtaining information about a formation, and can also be useful in planning subsequent fracturing or other stimulation operations.

SUMMARY

An embodiment of a system for performing a downhole operation includes a borehole string configured to be connected to a surface location, and a carrier disposed at the borehole string, the carrier configured to be deployed in a borehole in an earth formation. The carrier includes an isolation assembly including at least one packer having a deformable element configured to be deformed to cause the at least one packer to radially expand and isolate a section of a borehole in the earth formation, and an injection assembly in fluid communication with a fluid source and including at least one passage to introduce fluid into the isolated section, the injection assembly configured to inject a fluid into the isolated section and pressurize the isolated section. The system also includes a measurement assembly including an interrogation unit coupled to at least one optical fiber, the at least one optical fiber having a length that includes a plurality of measurement locations, the length disposed at the deformable element, the interrogation unit including an electromagnetic source configured to direct an optical signal into the optical fiber during the downhole operation and a detector configured to detect signals reflected by the plurality of measurement locations. The system further includes a processor configured to receive the reflected signals in real time during the downhole operation, calculate an amount of deformation of the deformable packer element, and estimate at least one property of the formation based on the deformation, the at least one property including a strain of the formation in response to injection of the fluid.

An embodiment of a method of performing a downhole operation includes deploying a carrier at a selected location in a borehole in an earth formation, the carrier including an isolation assembly that includes at least one packer having a deformable element, an injection assembly in fluid communication with a fluid source, and a measurement assembly including at least one optical fiber having a length that includes a plurality of measurement locations, the length disposed at the deformable element. The method also includes isolating a section of the borehole by deforming the deformable element to cause the at least one packer to radially expand and seal the at least one packer against a borehole wall, pressurizing the isolated section by injecting fluid into the isolated section through at least one passage of the injection assembly, measuring a deformation of the deformable element during the downhole operation by directing an optical signal into the optical fiber and detecting signals reflected by the plurality of measurement locations in real time during the downhole operation, calculating an amount of deformation of the deformable packer element based on the reflected signals by a processor, and estimating at least one property of the formation based on the deformation, the at least one property including a strain of the formation in response to injection of the fluid.

BRIEF DESCRIPTION OF THE DRAWINGS

The following descriptions should not be considered limiting in any way. With reference to the accompanying drawings, like elements are numbered alike.

DETAILED DESCRIPTION

The apparatuses, systems and methods described herein provide for performing and/or facilitating fluid injection operations, including testing operations such as mini-fracture or micro-fracture operations. Embodiments described herein utilize optical fiber sensors incorporated with packer elements for measuring and/or monitoring parameters such as strain, temperature and/or downhole pressure during injection and/or testing operations based on the deformation of packer elements. The optical fiber sensors can be used to measure parameters such as pressure, temperature and strain more accurately than convention sensing devices, as well as used to monitor deformation of packer elements to prevent damage and ensure packer integrity. In addition, the optical fiber sensors configured according to embodiments described herein provide for accurate measurements of the deformation of packer elements during formation testing operations, which can be used to estimate formation strain in response injection of fluids into the formation.

An embodiment of a testing tool is configured to perform mini-fracturing and/or micro-fracturing tests in a borehole. The testing tool incorporates components that include a borehole string, a fluid injection assembly and one or more packers for isolating a section of the borehole. In one embodiment, the one or more packers are straddle packers. The testing tool also includes a fiber optic measurement assembly having a processing unit and a light source coupled to at least one optical fiber. A selected length of the optical fiber is disposed at one or more packers, e.g., on the surface and/or within a packer, and is used to measure deformation of packer elements. The selected length includes measurement locations such as fiber Bragg gratings. An embodiment of a method includes measuring parameters of a borehole fluid and a formation volume around the isolated section (e.g., the pressure, temperature and/or strain) during a micro-fracturing and/or mini-fracturing test. In one embodiment, the parameters are measured and analyzed to estimate fracture and stress characteristics of the formation volume.

Figure 1:
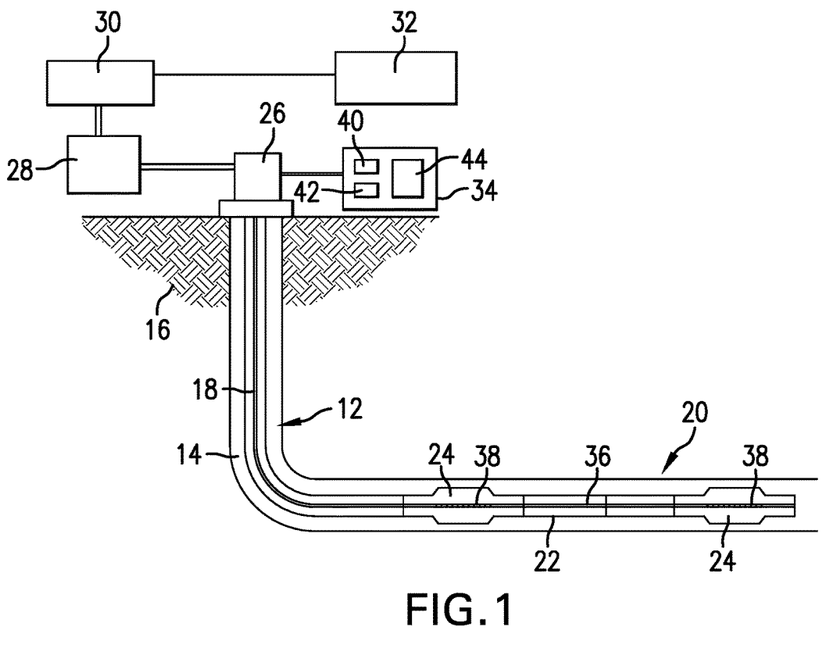
FIG. 1 depicts an embodiment of a downhole testing, stimulation and/or production system.

Referring to FIG. 1, an exemplary embodiment of a subterranean formation testing, stimulation and/or production system 10 includes a borehole string 12 disposed in a borehole 14 that penetrates at least one earth formation 16 during a subterranean operation. The borehole string, in one embodiment, includes a fluid conduit 18, such as coiled tubing or drill pipes. As described herein, "formations" refer to the various features and materials that may be encountered in a subsurface environment and surround the borehole. The borehole 14 may be an open hole or a cased borehole. The borehole string 12 includes a downhole tool 20 configured to be lowered into the borehole 12 and test and/or stimulate selected portions of the earth formation 16. The tool 20 may be included with any suitable carrier, such as the borehole string 12, one or more pipe sections, one or more downhole subs, and a bottomhole assembly (BHA). A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

The tool 20, in one embodiment, is an injection tool configured to apply fluid to a region of the formation (e.g., a volume surrounding a borehole) in order to perform an injection operation. As described herein, an "injection operation" refers to any energy industry operation that includes injection of fluids into the borehole 14 and/or pressurization of borehole regions. Examples of injection operations include stimulation operations such as hydraulic fracturing operations, and testing operations.

In one embodiment, the tool 20 is configured to perform a testing operation. Exemplary tests that can be performed by the tool 20 include mini-fracturing and micro-fracturing operations. The tool 20 includes an injection assembly 22, such as a fracture or "frac" sleeve device. The tool 20 also includes one or more isolation assemblies 24 configured to isolate a portion of the borehole 14. As referred to herein, an "isolated portion" or "isolated section" refers to a portion or section of the borehole 14 that is at least substantially isolated with respect to fluid pressure from the rest of the borehole 14. In one embodiment, the isolation assembly 24 is a packer sub or other component that includes one or more packers. A "fluid" refers to any flowable substance such as water, oil or other liquids, air, and flowable solids such as sand.

The tool 20 and/or the borehole 14 are operatively connected to various surface devices or systems for performing operations including stimulation, testing and measurement operations. For example, the tool 20 is connected via a wellhead 26 to a pumping unit 28 and a fluid source 30 for providing fluid to the borehole string 12 and/or an annular portion of the borehole 14.

One or more of the tool 20, the injection assembly 22, the isolation assembly 24 and other components may include suitable electronics or processors configured to communicate with a surface processing unit 32 configured to control the respective tool or assembly. The number, type and configuration of components that may be included in the system 10 are not limited to that described in the embodiment of FIG. 1. For example, various additional components may be included in the tool 20, the BHA and/or at other locations along the borehole string. Examples of such components include perforation assemblies, valve assemblies, sensors, electronic devices and others.

At least part of the system 10 is configured as a measurement system that includes an optical interrogator or measurement unit 34 connected in operable communication with at least one optical fiber sensor. The measurement unit 34 may be located at a surface location or incorporated with the borehole string 12 or tool 20, or otherwise disposed downhole as desired. The optical fiber sensor includes at least one optical fiber 36 configured to take a measurement or multiple measurements (e.g., distributed measurements) of a downhole parameter. The measurement system may be used to measure one or more of various parameters in and around the borehole, such as temperature, pressure, strain, vibration, fluid properties and others.

The optical fiber 36 includes one or more sensing locations 38 disposed along one or more selected lengths of the optical fiber 36, which are configured to reflect and/or scatter optical interrogation signals transmitted by the measurement unit 34. Examples of sensing locations 38 include manufactured reflectors such as fiber Bragg gratings (FBGs), and locations of intrinsic scattering such as Rayleigh scattering, Brillouin scattering and Raman scattering locations.

The measurement unit 34 includes, for example, one or more electromagnetic signal sources 40 such as a tunable light source, a LED and/or a laser, and one or more signal detectors 42 (e.g., photodiodes). A processing unit 44 may also be included in the measurement unit 34, for controlling the source and detector, and/or for processing the signals received at the detectors 42.

Figure 2:
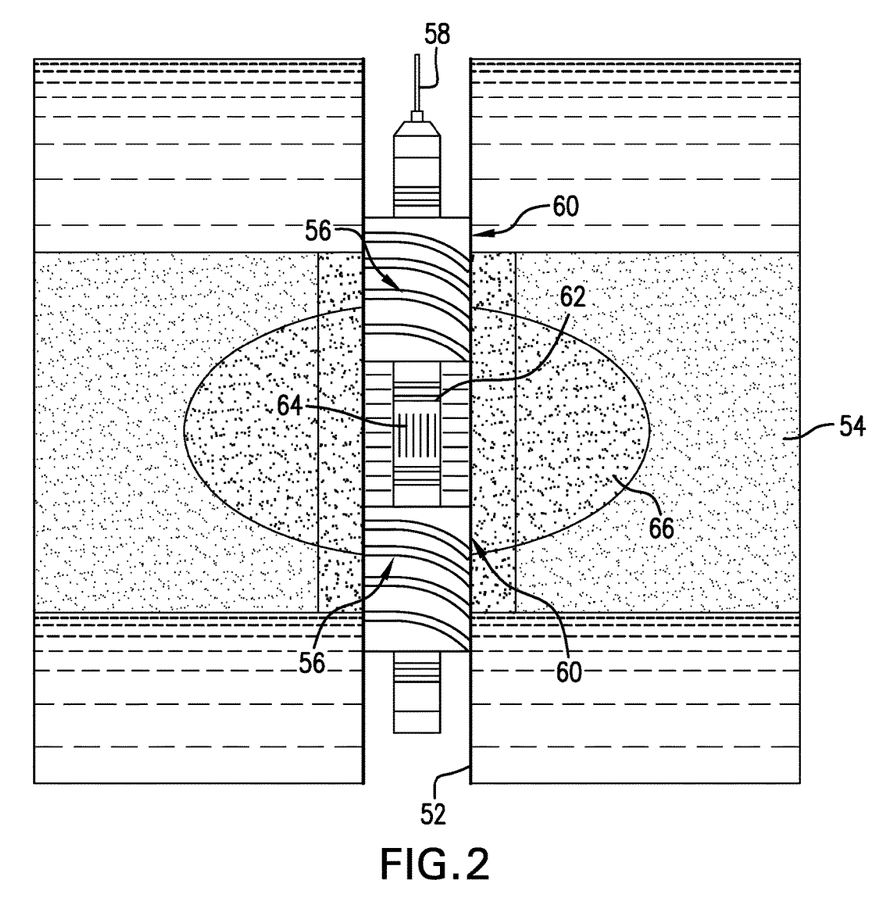
FIG. 2 depicts an embodiment of a formation testing tool.

FIG. 2 illustrates an embodiment of a tool 50 for stimulating and/or testing a portion of a formation. The tool 50 may be incorporated in a downhole system such as the system 10, but is not so limited. In one embodiment, the tool 50 is moveable along a length of a borehole 52 to allow for testing and/or stimulating a formation 54 at multiple depths and locations along the borehole 52. Although only a single tool 50 is shown in FIG. 2, multiple tools 50 may be disposed along a borehole string or other carrier to affect fracturing at multiple locations along the borehole 52.

The tool 50 is configured to perform operations including testing operations (also referred to simply as tests), which generally include injecting fluid into a volume of the formation 54 and measuring the response of the formation volume. The measured response is used to estimate formation properties, e.g., stress properties such as horizontal stress. Such tests can also be used to design and plan subsequent hydraulic fracturing operations. In one embodiment, testing operations are performed by injecting fluid into the formation at a pressure that is less than a pressure used to perform typical hydraulic fracturing operations.

Some test operations, such as micro-fracturing and mini-fracturing operations, differ from typical full-scale stimulation or fracturing operations in that the formation is not fractured to an extent intended to be practical or usable for production, but rather the formation is stimulated to collect pressure, temperature, strain and/or other data to evaluate properties such as stress and fracture network characteristics. For example, the tests may use a small amount of fluid relative to full-scale operations, and/or inject fluid at lower pressures than those used during full-scale operations. In some cases, fluid injected during a test does not include any, or at least not a significant amount of, proppant. The desired result of tests such as micro-fracturing tests is not a propped formation fracture, but a small scale, relatively short duration fracture that can be used to measure pressure response and/or decline for estimating formation properties.

One example of a test that can be performed by the tool 50 is a micro-fracturing or "micro-frac" test. Micro-frac tests may be used to perform in-situ stress measurements of the formation. During a micro-frac test, the tool 50 pressurizes an isolated section of the borehole 52 and monitors the pressure of the isolated section in real time. Based on pressure measurements (and, if desired, temperature measurements), parameters such as formation breakdown pressure and fracture closure pressure can be estimated, which are used to evaluate stress characteristics and/or plan subsequent fracturing operations. As discussed above, micro-frac operations are typically characterized by much lower injection fluid rates and volumes than would be used during a full-scale fracturing operation.

Another example of a test that can be performed by the tool 50 is a mini-fracturing or "mini-frac" test, which is a small hydraulic stimulation fluid treatment normally used to acquire job design and execution data and confirm the predicted response of a formation region that is to be stimulated. Mini-frac tests can be used to provide design data from the parameters associated with the injection of fluids and the subsequent pressure decline. Mini-frac treatments include injecting fluid and examining rate and pressure data during and after injection. Aspects of mini-frac tests include, for example, pump-in/shut-in tests for stress determination, step-rate interpretation, and conventional or unconventional pressure decline analysis. Parameters that can be calculated or measured include shut-in pressure, closure pressure, fracture efficiency, individual fracture geometry, leakoff coefficients, and near-wellbore effects. As compared to micro-frac tests, mini-frac tests involve the injection of higher injection fluid amounts and flow rates, and typically require the use of the same fluid that is planned for a full-scale fracturing operation, in order to mimic the full-scale operation.

The tool 50 is connected to a measurement unit, such as the measurement unit 34, by at least one optical fiber 56. The measurement unit includes a laser or other electromagnetic source configured to launch an optical signal into the fiber 56, a detector configured to receive reflected signals, and a processor configured to control the measurement unit, acquire signal data, and/or analyze signal data. In the embodiment shown in FIG. 2, the tool 50 and the optical fiber 56 are connected to the measurement unit by a wireline 58. In other embodiments (such as the embodiment shown in FIG. 1), the tool 50 is connected to the surface via a fluid conduit or other type of borehole string.

In this embodiment, the tool 50 has an isolation assembly that is configured as a pair of straddle packers 60, i.e., upper and lower packers, which can be actuated to isolate a section of the borehole 52, referred to as an isolated section. The number and position of the straddle packers 60 is not limited to that of the embodiment of FIG. 2. The straddle packers 60 may any suitable type of isolation device or component, such as an inflatable packer, an expandable material, a swellable material and a spring-type or mechanical assembly. For example, the straddle packers 60 are inflatable packers in fluid communication with the fluid conduit via one or more packer valves such as ball seat valves. In another example, the straddle packers 60 are compression or tension set packers that are actuated by a mechanical actuator. Each packer 60 provides a pressure barrier within the borehole 52 and separates downhole fluid above and/or below the packer 60 from fluid in the isolated section. Upon actuation of the straddle packers 60 and isolation of the isolated section, a frac sleeve or other mechanism is activated to allow fluid to be injected into the isolated section through.

The optical fiber 56 includes measurement locations such as FBGs that are located at least along selected sections or lengths of the optical fiber (referred to as measurement lengths"). The measurement lengths are disposed at a deformable element of each packer 60 so that deformation of the deformable packer element causes a change in the optical length of at least part of a respective measurement length, e.g., causes a change in distance between FBGs. This change can cause a change in the wavelength or phase of a reflected optical signal, which can be used to estimate an amount of deformation of the packer element. The amount of deformation can in turn be used to estimate parameters such as strain, pressure or change in pressure of the isolated section, and temperature. In one embodiment, the amount of deformation is correlated with a strain in the formation, which is useful especially in generating or updating a stress and/or fracture model of the formation. For example, the measured deformation of the deformable packer element is used to estimate lateral tectonic strain in the calibration of a horizontal stress model. In another example, the measured deformation is used to detect and/or measure strain due to formation breakdown in the packer region (e.g., a "sleeve fracture").

In one embodiment, the optical fiber 56, or additional optical fibers, are configured to measure multiple parameters such as temperature, vibration and acoustic events. For example, single point multiplexed temperature, strain, acceleration and/or vibration sensors can be etched directly into a fiber FBGs to allow for measurement pressure, temperature and strain using a single fiber. In another example, co-located fibers can be utilized for measuring strain, temperature and/or acoustic signals.

The measurement lengths may be disposed in any suitable manner so that parameters such as strain, pressure and temperature can be acquired during an injection operation such as a micro-frac or other formation test. For example, a measurement length is disposed on an exterior surface of a deformable portion of each packer 60 to allow for, e.g., measurements of deformation of the packer, which can be used to estimate changes in pressure within the packer 60 and/or within the isolated section. In the embodiment shown in FIG. 2, the selected lengths are wrapped around and disposed on an exterior surface of the deformable packer elements in a helical or spiral configuration. However, the optical fiber lengths can be positioned or disposed in any manner suitable to measure deformation.

Other components of the tool 50 include an injection assembly or injection device 62 that includes one or more passages or holes 64 through which fluid is injected into the isolated section and into a volume 66 of the formation 54 at least partially surrounding the isolated section. The injection device may include an actuation mechanism such as a sleeve or valves to allow the fluid to be injected.

Figure 3:
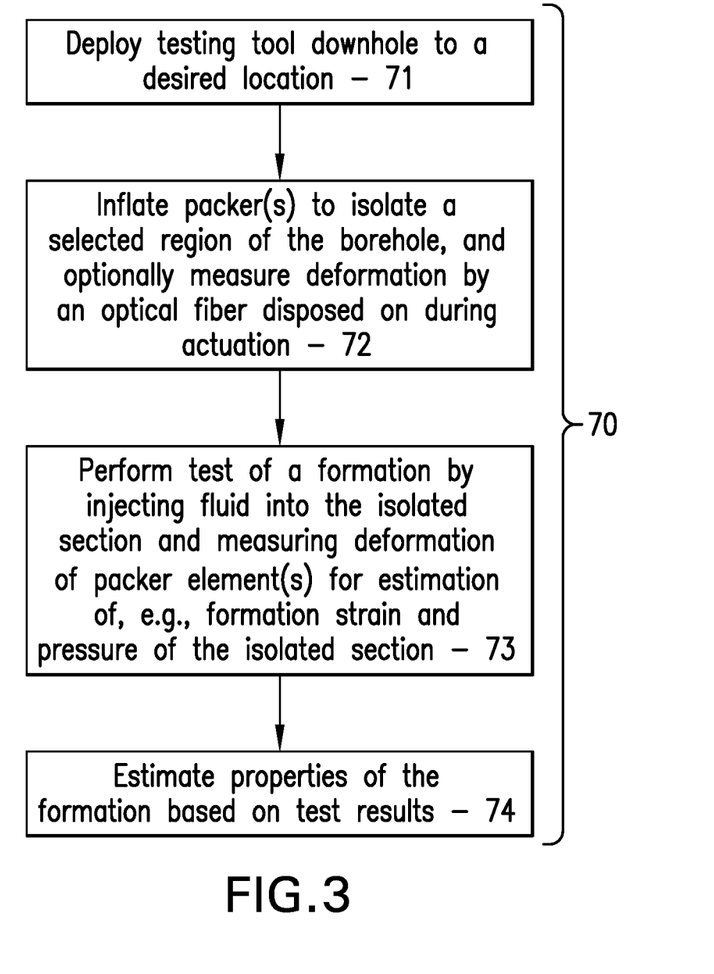
FIG. 3 is a flow diagram depicting a method of performing an injection operation in a borehole in an earth formation.

FIG. 3 illustrates an embodiment of a method 70 of performing an injection operation in an earth formation. The method 70 includes one or more stages 71-74. The method 70 may be performed repeatedly and/or periodically as desired, and may be performed for multiple depths in a selected length of the borehole 14. The method 70 is described herein in conjunction with the downhole tool 50, although the method may be performed in conjunction with the system 10 and/or with any number and configuration of processors, sensors and tools. The method 70 may be performed in conjunction with or by one or more processors or other devices capable of receiving and processing measurement data, such as the surface processing unit 32 and or the measurement unit 34, or downhole electronics units. In one embodiment, the method 70 includes the execution of all of stages 71-74 in the order described. However, certain stages 71-74 may be omitted, stages may be added, or the order of the stages changed.

The embodiment of the method 70 is described in conjunction with a micro-fracturing operation, but is not so limited. The method 70 may be performed in conjunction with various injection operations, such as mini-fracturing or other testing operations, and hydraulic fracturing or other stimulation operations.

In the first stage 71, the tool 50 is deployed downhole and advanced along the borehole 14 to a desired position, such as via a production string 12 or a wireline. The desired position is a depth or point along the borehole 14 at which a fracture is desired to be initiated. The desired point could be selected, for example, from previous formation evaluation measurements, such as logs, mineralogy studies and/or models generated from logging-while-drilling (LWD) or wireline measurements so that the stress risers and packers are placed at optimum locations.

The borehole may be a cased borehole, an open borehole, or a partially cased borehole. If the borehole is an open borehole, packers can be actuated and testing performed directly on the formation through the borehole wall. If the borehole is a cased borehole, a section of the casing at the desired location may be perforated by a perforating assembly in the tool or a separate tool or device.

In the second stage 72, when the tool 50 is located at desired position, the packers 60 are actuated to isolate a section of the borehole 52. For example, a pumpout module or other device pumps fluid from the borehole above the upper packer 60 into the packers 60 to inflate deformable packer elements of the packers 60. In another example, the packers can be set by compressing the packers or actuating shape memory material.

As discussed above, the tool 50 includes at least one optical fiber 56 having a measurement length disposed on exterior surfaces of the deformable packer elements. The measurement length may be attached, for example, by an adhesive or by disposing the measurement length along a groove in the exterior surface or embedded within the material forming the deformable element. A protective coating or layer such as a rubber sleeve or other deformable material may be included to surround the optical fiber and protect it from damage due to, e.g., contact with the borehole wall. The protective coating may also serve to hold the measurement length in place at the exterior surface. In one embodiment, the optical fiber is wrapped in a helical or spiral path around an exterior surface of the deformable packer element. Characteristics of the helical path such as pitch angle and number of turns can be selected to control the amount of strain experienced by the optical fiber as the packer element expands radially.

During actuation of the packers 60, measurements of deformation may be acquired by detecting change in optical path length between measurement locations of the optical fiber. Other parameters such as fluid pressure and temperature may be measured using the same optical fiber or additional fibers co-located with the fiber. Although pressure and temperature measurements are described herein as using the optical fiber 56 and/or other optical fibers, any suitable measurement device may be used to measure temperature and/or pressure. For example, discrete sensors may be used to measure pressure and/or temperature.

The deformation of the packer may be measured based on earlier calibrations of the tool prior to deployment. Deformation measurements may be used to monitor the packer to determine, e.g., when the packer is fully set and to compare the deformation to selected limits to avoid damage to the packer.

In the third stage 73, a testing operation is initiated by injecting fluid and/or increasing the fluid pressure in the isolated section. In one embodiment, fluid is injected at flow rates and pressures that are less than flow rates and pressures required to perform a full scale fracturing operation. For example, the test includes pressurizing an isolated section to a formation breakdown pressure, which is the pressure at which the formation begins to fracture, allowing pressure to drop, and optionally re-pressurizing to pressures at or below the breakdown pressure. This is in contrast to hydraulic fracturing operations, in which pressures are maintained significantly above the breakdown pressure.

In one embodiment, the test is a micro-fracturing test that is initiated by pressurizing the isolated section to a formation breakdown pressure. Pressure in the isolated section is increased, and the pressure in the isolated region is monitored, e.g., by optically interrogating the optical fiber length, estimating deformation of the fiber length, and correlating the deformation to pressure. The pressure is increased until a pressure drop indicating breakdown occurs. The packer elements are monitored continuously or periodically and in real time during the operation, to measure deformation, which may be used to estimate formation strain in response to the injected fluid.

After breakdown is observed, the pressure is monitored and allowed to drop until closure pressure is reached. After a selected period of time, the isolated section can be re-pressurized to a fracture re-opening pressure. The fracture re-opening pressure is identified similarly to the breakdown pressure, i.e., by monitoring the packer deformation and associated isolated section pressure as the pressure increases, and identifying the re-opening pressure as a leveling off or dropping of the pressure. At this point, pumping can be stopped to observe propagation and fracture closing.

During the test, in one embodiment, the deformation of the packer elements is measured and correlated with or otherwise associated with formation strain. Precise measurements of formation strain allow for accurate estimations of formation stresses, such as horizontal stresses. Measurements of the formation strain may also be used to identify when an induced fracture occurs at the packer elements. Measurements of changes in deformation may also be used to estimate the propagation distance of induced fractures.

Also during the test, measurements of deformation of the packer elements may be monitored to ensure that the packer elements are not excessively deformed, thereby helping to ensure that the packers 60 operate properly and that their integrity has not been compromised. In one embodiment, the deformation is compared to a maximum allowable deformation. If the measured deformation meets or exceeds, or otherwise is within some selected range of the maximum allowable deformation, a remedial action may be performed. Examples of remedial actions include notifying an operator or processor controlling the operation, and/or automatically stopping the operation, reducing pumping pressure or otherwise modifying operational parameters.

Monitoring the packer elements for excessive deformation is particularly useful in highly plastic and unconsolidated formation. Knowing the strain in real time can help to prevent excessive deformation of the straddle packer elements as the packer inflation can be stopped once the strain exceeds an acceptable limit to get a good seal for the testing interval.

In the fourth stage 74, properties of the formation are analyzed based on results of the formation test. For example, estimation of breakdown pressure, pressure declines and re-opening pressures are used to estimate stress and fracture characteristics. This information can be used in the construction of a fracture model (e.g., a discrete fracture network model) and/or used in constructing stress models of the formation. In one embodiment, the formation strain measured at or during the closure pressure is used as an input into a stress model, e.g., by correlating the formation strain with the lateral tectonic strain in the calibration of a horizontal stress model.

In one embodiment, properties of the formation that can be analyzed include the occurrence and/or extent of formation breakdown and fracturing in a region at or near a packer (e.g., at or near an upper packer and/or a lower packer). An example of such formation breakdown in the packer region is referred to as sleeve fracture or sleeve fracturing. The location of formation breakdown and/or fracturing can be estimated by, e.g., comparing stress or strain measurements at a formation region surrounding the isolated to stress or strain measurements at the packer region.

Figure 4:
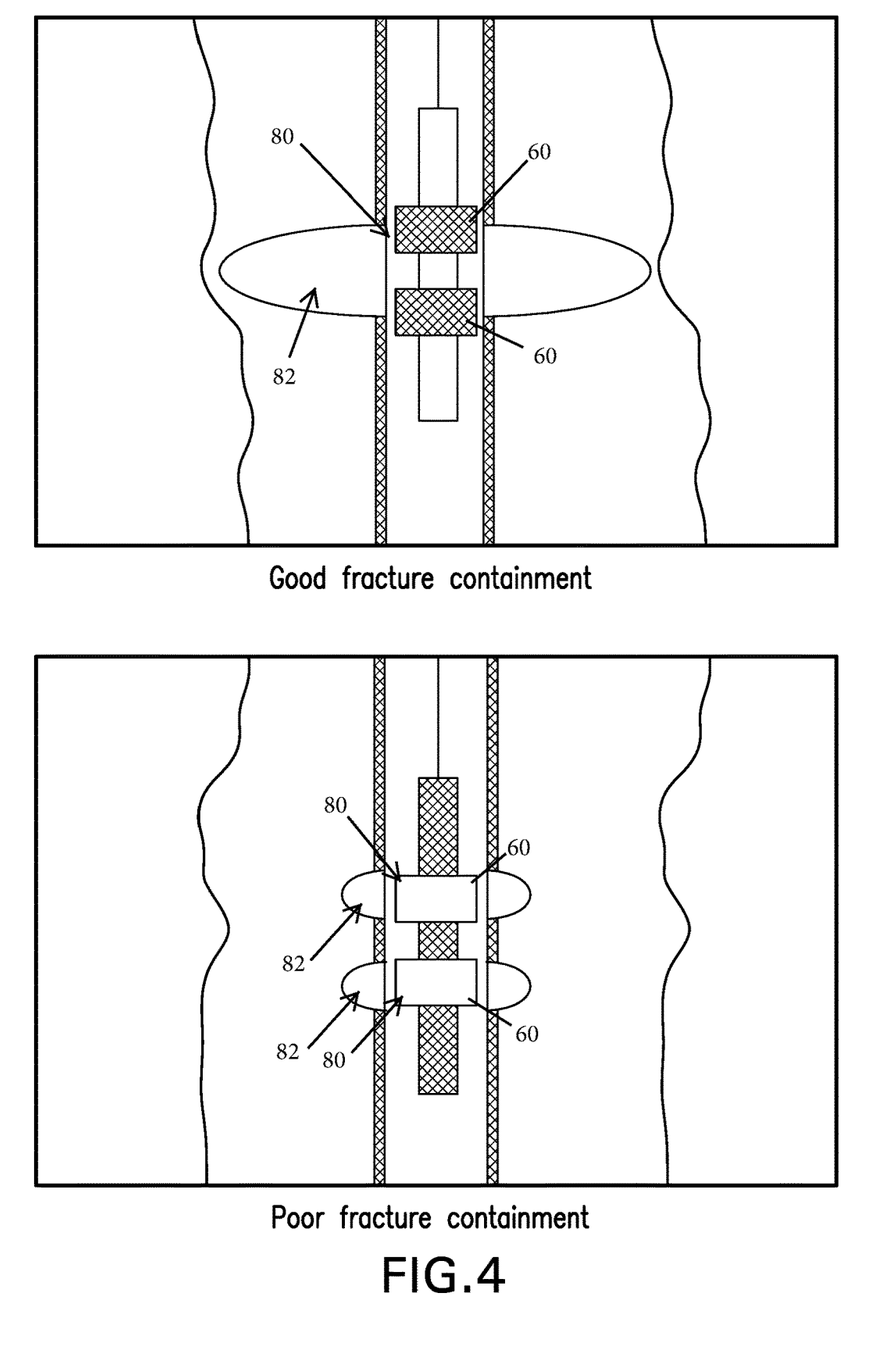
FIG. 4 depicts an example of formation properties detected and/or measured via embodiments described herein such as the formation testing tool of FIG. 2.

For example, referring to FIG. 4, strain measurements using one or more optical fibers disposed on one or more straddle packers 60 are taken and associated with stress and/or strain at one or more packer regions 80. Stress and/or strain at a formation region 82 surrounding an isolated section is also measured using, e.g., isolated section pressure measurements. Stress at the regions 80 and 82 are compared to determine whether formation breakdown or fracturing has occurred in the packer region 80 and/or the formation region 82. For example, a negative stress contrast (lower stresses in the packer regions 80 as opposed to the formation region 82 around the isolated section, and higher stresses in the formation region 82 indicates that a micro-fracture or micro-fractures are occurring or have occurred at the packer, and thus the micro-fracturing stimulation is not a contained fracture. Sleeve fractures in the packer region(s) 80 can be identified in order to detect instances of poor fracture containment, i.e., instances where micro-fracturing has not been contained in the formation region 82, but includes sleeve fractures.

The systems and methods described herein provide various advantages over existing processing methods and devices. For example, the embodiments described herein provide precise measurements of parameters such as pressure and strain, which can greatly reduce the uncertainty in estimating stress characteristics such as horizontal stresses caused by lateral tectonic strain downhole. Another advantage is that that the optical fiber configurations according to the embodiments are immune to interference from electromagnetic fields, do not electrically disturb other devices, and are suitable for harsh environments typified by high temperatures and pressures. In addition, the measurement assemblies can also be designed to be extremely small and light-weight, and also require low installation and operational costs. Furthermore, positioning the measurement lengths at the exterior of deformable packer elements reduces or eliminates effects due to pump operations or valve controls.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

Set forth below are some embodiments of the foregoing disclosure:

Embodiment 1: A system for performing a downhole operation, comprising: a borehole string configured to be connected to a surface location; a carrier disposed at the borehole string, the carrier configured to be deployed in a borehole in an earth formation, the carrier including: an isolation assembly including at least one packer having a deformable element configured to be deformed to cause the at least one packer to radially expand and isolate a section of a borehole in the earth formation; and an injection assembly in fluid communication with a fluid source and including at least one passage to introduce fluid into the isolated section, the injection assembly configured to inject a fluid into the isolated section and pressurize the isolated section; a measurement assembly including an interrogation unit coupled to at least one optical fiber, the at least one optical fiber having a length that includes a plurality of measurement locations, the length disposed at the deformable element, the interrogation unit including an electromagnetic source configured to direct an optical signal into the optical fiber during the downhole operation and a detector configured to detect signals reflected by the plurality of measurement locations; and a processor configured to receive the reflected signals in real time during the downhole operation, calculate an amount of deformation of the deformable packer element, and estimate at least one property of the formation based on the deformation, the at least one property including a strain of the formation in response to injection of the fluid.

Embodiment 2: The system of embodiment 1 wherein the packer is a straddle packer.

Embodiment 3: The system of embodiment 1 wherein the optical fiber length is disposed on an exterior surface of the deformable element.

Embodiment 4: The system of embodiment 3 wherein the optical fiber length is wrapped around the exterior surface along a helical path.

Embodiment 5: The system of embodiment 1 wherein the downhole operation is a formation test operation, the formation test operation including injecting fluid into the isolated section and a volume of the formation, and measuring a response of the formation to the injecting.

Embodiment 6: The system of embodiment 1 wherein the processor is configured to input the estimated strain into a formation stress model, and update the formation stress model based on the estimated strain.

Embodiment 7: The system of embodiment 1 wherein the at least one property includes at least one of a temperature and a pressure of the isolated section.

Embodiment 8: The system of embodiment 1 wherein the downhole operation is a micro-fracturing operation that includes: applying fluid pressure to the isolated section and monitoring a pressure of the isolated section; identifying a formation breakdown pressure in which the pressure of the isolated section drops or levels off; and stopping the applying and allowing the pressure of the isolated section to decline, and estimating pressures at which at least one of fracture propagation and fracture closure occurs.

Embodiment 9: The system of embodiment 1 wherein the processor is configured to monitor the deformation, compare the deformation to maximum allowable deformation, and perform a remedial action in response to the deformation having a magnitude within a selected range or exceeding the maximum allowable deformation.

Embodiment 10: The system of embodiment 1 wherein at least the isolation assembly, the injection assembly and the optical fiber length are configured as a micro-fracturing tool.

Embodiment 11: A method of performing a downhole operation, comprising: deploying a carrier at a selected location in a borehole in an earth formation, the carrier including an isolation assembly that includes at least one packer having a deformable element, an injection assembly in fluid communication with a fluid source, and a measurement assembly including at least one optical fiber having a length that includes a plurality of measurement locations, the length disposed at the deformable element; isolating a section of the borehole by deforming the deformable element to cause the at least one packer to radially expand and seal the at least one packer against a borehole wall; pressurizing the isolated section by injecting fluid into the isolated section through at least one passage of the injection assembly; measuring a deformation of the deformable element during the downhole operation by directing an optical signal into the optical fiber and detecting signals reflected by the plurality of measurement locations in real time during the downhole operation; and calculating an amount of deformation of the deformable packer element based on the reflected signals by a processor; and estimating at least one property of the formation based on the deformation, the at least one property including a strain of the formation in response to injection of the fluid.

Embodiment 12: The method of embodiment 11 wherein the packer is a straddle packer.

Embodiment 13: The method of embodiment 11 wherein the optical fiber length is disposed on an exterior surface of the deformable element.

Embodiment 14: The method of embodiment 13 wherein the optical fiber length is wrapped around the exterior surface along a helical path.

Embodiment 15: The method of embodiment 11 wherein the downhole operation is a formation test operation, the formation test operation including injecting fluid into the isolated section and a volume of the formation, and measuring a response of the formation to the injecting.

Embodiment 16: The method of embodiment 11 wherein estimating the property includes inputting the estimated strain into a formation stress model, and updating the formation stress model based on the estimated strain.

Embodiment 17: The method of embodiment 11 wherein the at least one property includes at least one of a temperature and a pressure of the isolated section.

Embodiment 18: The method of embodiment 11 wherein the downhole operation is a micro-fracturing operation that includes: applying fluid pressure to the isolated section and monitoring a pressure of the isolated section; identifying a formation breakdown pressure in which the pressure of the isolated section drops or levels off; and stopping the applying and allowing the pressure of the isolated section to decline, and estimating pressures at which at least one of fracture propagation and fracture closure occurs.

Embodiment 19: The method of embodiment 11, further comprising comparing the deformation to maximum allowable deformation, and performing a remedial action in response to the deformation having a magnitude within a selected range or exceeding the maximum allowable deformation.

Embodiment 20: The method of embodiment 11 wherein at least the isolation assembly, the injection assembly and the optical fiber length are configured as a micro-fracturing tool.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

The invention claimed is:

1. A system for performing a downhole operation, comprising:
   a borehole string configured to be connected to a surface location;
   a carrier disposed at the borehole string, the carrier configured to be deployed in a borehole in an earth formation, the carrier including:

an isolation assembly including at least one packer having a deformable element configured to be deformed to cause the at least one packer to radially expand and isolate a section of the borehole in the earth formation; and an injection assembly in fluid communication with a fluid source and including at least one passage to introduce fluid into the isolated section, the injection assembly configured to inject the fluid into the isolated section and pressurize the isolated section;

a measurement assembly including an interrogation unit coupled to at least one optical fiber, the at least one optical fiber having a length that includes a plurality of measurement locations, the length disposed at the deformable element, the interrogation unit including an electromagnetic source configured to direct an optical signal into the optical fiber during the downhole operation and a detector configured to detect signals reflected by the plurality of measurement locations; and a processor configured to receive the reflected signals in real time during the downhole operation, calculate an amount of deformation of the deformable element, and estimate at least one property of the formation based on the deformation, the at least one property including a strain of the formation in response to injection of the fluid.

2. The system of claim 1, wherein the packer is a straddle packer.

3. The system of claim 1, wherein the length is disposed on an exterior surface of the deformable element.

4. The system of claim 3, wherein the length is wrapped around the exterior surface along a helical path.

5. The system of claim 1, wherein the downhole operation is a formation test operation, the formation test operation including injecting the fluid into the isolated section and a volume of the formation, and measuring a response of the formation to the injecting.

6. The system of claim 1, wherein the processor is configured to input the estimated strain into a formation stress model, and update the formation stress model based on the estimated strain.

7. The system of claim 1, wherein the at least one property includes at least one of a temperature and a pressure of the isolated section.

8. The system of claim 1, wherein the downhole operation is a micro-fracturing operation that includes:

applying fluid pressure to the isolated section and monitoring a pressure of the isolated section;

identifying a formation breakdown pressure in which the pressure of the isolated section drops or levels off; and stopping the applying and allowing the pressure of the isolated section to decline, and estimating pressures at which at least one of fracture propagation and fracture closure occurs.

9. The system of claim 1, wherein the processor is configured to monitor the deformation, compare the deformation to maximum allowable deformation, and perform a remedial action in response to the deformation having a magnitude within a selected range or exceeding the maximum allowable deformation.

10. The system of claim 1, wherein at least the isolation assembly, the injection assembly and the length are configured as a micro-fracturing tool.

11. A method of performing a downhole operation, comprising:

deploying a carrier at a selected location in a borehole in an earth formation, the carrier including an isolation assembly that includes at least one packer having a deformable element, an injection assembly in fluid communication with a fluid source, and a measurement assembly including at least one optical fiber having a length that includes a plurality of measurement locations, the length disposed at the deformable element;

isolating a section of the borehole by deforming the deformable element to cause the at least one packer to radially expand and seal the at least one packer against a wall of the borehole;

pressurizing the isolated section by injecting fluid into the isolated section through at least one passage of the injection assembly;

measuring a deformation of the deformable element during the downhole operation by directing an optical signal into the optical fiber and detecting signals reflected by the plurality of measurement locations in real time during the downhole operation; and calculating an amount of deformation of the deformable element based on the reflected signals by a processor; and estimating at least one property of the formation based on the deformation, the at least one property including a strain of the formation in response to injection of the fluid.

12. The method of claim 11, wherein the packer is a straddle packer.

13. The method of claim 11, wherein the length is disposed on an exterior surface of the deformable element.

14. The method of claim 13, wherein the length is wrapped around the exterior surface along a helical path.

15. The method of claim 11, wherein the downhole operation is a formation test operation, the formation test operation including injecting fluid into the isolated section and a volume of the formation, and measuring a response of the formation to the injecting.

16. The method of claim 11, wherein estimating the property includes inputting the estimated strain into a formation stress model, and updating the formation stress model based on the estimated strain.

17. The method of claim 11, wherein the at least one property includes at least one of a temperature and a pressure of the isolated section.

18. The method of claim 11, wherein the downhole operation is a micro-fracturing operation that includes:

applying fluid pressure to the isolated section and monitoring a pressure of the isolated section;

identifying a formation breakdown pressure in which the pressure of the isolated section drops or levels off; and stopping the applying and allowing the pressure of the isolated section to decline, and estimating pressures at which at least one of fracture propagation and fracture closure occurs.

19. The method of claim 11, further comprising comparing the deformation to maximum allowable deformation, and performing a remedial action in response to the deformation having a magnitude within a selected range or exceeding the maximum allowable deformation.

20. The method of claim 11, wherein at least the isolation assembly, the injection assembly and the length are configured as a micro-fracturing tool.

\* \* \* \* \*